United States Patent
Shallice et al.

(10) Patent No.: US 10,884,603 B2
(45) Date of Patent: Jan. 5, 2021

(54) GRAPHICAL USER INTERFACE SYSTEM AND METHOD FOR TRANSFERRING DATA ACQUISITION AND ANALYSIS SETTINGS

(71) Applicant: LIFE TECHNOLOGIES CORPORATION, Carlsbad, CA (US)

(72) Inventors: Matthew Shallice, Eugene, OR (US); Justin Hicks, Eugene, OR (US); Charysse Archer, Eugene, OR (US); Laurel Stone, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 821 days.

(21) Appl. No.: 15/117,482

(22) PCT Filed: Jan. 28, 2015

(86) PCT No.: PCT/US2015/013199
§ 371 (c)(1),
(2) Date: Aug. 9, 2016

(87) PCT Pub. No.: WO2015/134130
PCT Pub. Date: Sep. 11, 2015

(65) Prior Publication Data
US 2016/0370966 A1    Dec. 22, 2016

Related U.S. Application Data

(60) Provisional application No. 61/947,331, filed on Mar. 3, 2014.

(51) Int. Cl.
*G06F 9/48* (2006.01)
*G06F 3/0486* (2013.01)
(Continued)

(52) U.S. Cl.
CPC .......... *G06F 3/0486* (2013.01); *G06F 3/0482* (2013.01); *G06F 3/04812* (2013.01); *G06F 3/04817* (2013.01)

(58) Field of Classification Search
CPC .. G06F 3/0486; G06F 3/04812; G06F 3/0482; G06F 3/04817
See application file for complete search history.

(56) References Cited

U.S. PATENT DOCUMENTS 5,764,873 A * 6/1998 Magid .................. G06F 3/0486
715/769
5,913,063 A * 6/1999 McGurrin ............. G06F 9/4492
717/109
(Continued)

FOREIGN PATENT DOCUMENTS

EP         1197351          4/2002
WO      2004/097585       11/2004
(Continued)

OTHER PUBLICATIONS

Anjum, "Drag and drop", https://www.codeguru.com/cpp/controls/treeview/dragdrop/article.php/c707/Drag-and-drop.htm, Aug. 1998.*
(Continued)

*Primary Examiner* — Jennifer N To
*Assistant Examiner* — KC Chen
(74) *Attorney, Agent, or Firm* — BakerHostetler

(57) ABSTRACT

Provided are methods and systems by which a user can drag a first icon associated with a first set of settings and drop the first icon onto a second icon located on a displayed level wherein the second icon is associated with a second set of settings. In response to dropping the first icon onto the second icon, the second set of settings can be overwritten
(Continued)

with a copy of the first set of settings. A graphical user interface can also be updated to display the changes in the second set of settings.

13 Claims, 4 Drawing Sheets

(51) Int. Cl.
*G06F 3/0482* (2013.01)
*G06F 3/0481* (2013.01)

(56) References Cited

U.S. PATENT DOCUMENTS

| | | | | |
|---|---|---|---|---|
| 6,105,062 | A * | 8/2000 | Andrews | G06F 16/9027 709/223 |
| 6,108,004 | A * | 8/2000 | Medl | G06F 3/0482 706/46 |
| 6,421,571 | B1 * | 7/2002 | Spriggs | G05B 15/02 345/629 |
| 6,687,698 | B1 * | 2/2004 | Nixon | G05B 19/4145 |
| 7,020,696 | B1 * | 3/2006 | Perry | H04L 41/0856 709/217 |
| 7,089,530 | B1 * | 8/2006 | Dardinski | G05B 15/02 700/83 |
| 8,832,567 | B1 * | 9/2014 | Jing | G06F 3/0486 715/738 |
| 9,977,772 | B1 * | 5/2018 | Samadani | G06F 17/246 |
| 2002/0059288 | A1 * | 5/2002 | Yagi | G06F 16/10 |
| 2003/0038842 | A1 * | 2/2003 | Peck | G06F 11/263 715/763 |
| 2003/0132967 | A1 * | 7/2003 | Gangadharan | G06F 16/957 715/769 |
| 2003/0160825 | A1 * | 8/2003 | Weber | G06F 3/0486 715/769 |
| 2005/0137840 | A1 * | 6/2005 | Peck | G06F 9/44505 703/13 |
| 2005/0251812 | A1 * | 11/2005 | Hayward | G06F 16/258 719/328 |
| 2006/0070007 | A1 * | 3/2006 | Cummins | G06F 16/2428 715/769 |
| 2006/0206866 | A1 * | 9/2006 | Eldrige | G06F 8/71 717/122 |
| 2007/0006234 | A1 * | 1/2007 | Ogata | G06F 3/1204 718/101 |
| 2007/0016872 | A1 * | 1/2007 | Cummins | G06F 3/0486 715/769 |
| 2007/0150834 | A1 * | 6/2007 | Muller | G06F 3/04817 715/810 |
| 2008/0028338 | A1 * | 1/2008 | Kodosky | G05B 19/0426 715/835 |
| 2009/0063571 | A1 * | 3/2009 | Narimatsu | G06F 16/16 |
| 2009/0113331 | A1 * | 4/2009 | Smith | G06F 8/34 715/769 |
| 2009/0195823 | A1 * | 8/2009 | Watanabe | G06F 3/1204 358/1.15 |
| 2010/0011311 | A1 * | 1/2010 | Kodosky | G05B 19/0426 715/771 |
| 2014/0223366 | A1 * | 8/2014 | Sato | G06F 3/1204 715/810 |
| 2016/0154986 | A1 * | 6/2016 | Yeakley | G06F 17/2247 235/462.46 |

FOREIGN PATENT DOCUMENTS

| | | |
|---|---|---|
| WO | 2008/113716 | 9/2008 |
| WO | 2011/037558 | 3/2011 |

OTHER PUBLICATIONS

"Epson EMP Monitor v4.10 Operation Guide", pp. 1-35, Seiko Epson Corporation, 2006.*
IDL User Interface Programming, IDL Version 6.4, ITT Visual Information Solutions, pp. 1-272, Apr. 2007.*
"What's New in IDL 6.3", press release, RSI Inc., pp. 1-2, 2007.*
"LabWindows/CVI—Getting Started with LabWindows/CVI", National Instruments, Oct. 2010.*
"NI DIAdem—Data Acquisition and Visualization" user manual, National Instruments, Jul. 2012.*
Tadas, "VC++ Article: CTreeCtrl, OLE Drag and Drop Copy between Tree Controls", retrieved by The Internet Archive Wayback Machine on May 29, 2013, https://web.archive.org/web/20130529032511/http://www.ucancode.net/VC_Library_Control_Tool/OLE-DRAG-DROP-TREE-Control-CTreeCtrl-VCArticle.htm, 2009.*
"TreeView dragAndDrop to copy not to move", Telerik Forums, https://www.telerik.com/forums/treeview-draganddrop-to-copy-not-to-move, Apr. 2, 2013.*
PCT/US2015/013199, International Preliminary Report on Patenability dated Sep. 15, 2006, 9 pp.
PCT/US2015/013199, International Search Report on Written Opinion dated Apr. 21, 2015, 12 Pages.

* cited by examiner

Experiment explorer

Filter by ▼

[ Apply ]

| Name | Date ˅ |
|---|---|
| ⊟ 👤 Justin's experiments | |
| ⊞ ⊞ Plate experiment 1 | 08/10/13 |
| ⊞ ⊞ Plate experiment 2 | 08/07/13 |
| ⊞ ⊓ Tube experiment 1  [WS][I] | 08/06/13 |
| ⊞ ⊓ Tube experiment 2  [WS][I] | 07/14/13 |
| ⊟ ⋀ Compensation | 07/02/13 |
| ✓ BL1 | |
| ✓ BL2 | |
| ✓ BL3 | |
| ✓ BL4 | |
| ⊞ ⊓ Group 1 | |
| ⊞ ⊓ Group 2 | |
| ⊞ ⊓ Group 3  [WS] | |
| ✓ Sample 1  [WS][IS] | |
| ✓ Sample 2  [WS] | |
| ✓ Sample 3 | |
| ✓ Sample 4  [WS][IS] | |
| Sample 5 | |
| ⊞ 📁 Shared folder 1 | |

FIG. 4 ial phase of International
GRAPHICAL USER INTERFACE SYSTEM AND METHOD FOR TRANSFERRING DATA ACQUISITION AND ANALYSIS SETTINGS

CROSS-REFERENCE TO RELATED APPLICATIONS

This application is a 371 national phase of International application no. PCT/US2015/013199 filed Jan. 28, 2015, which claims priority to U.S. application No. 61/947,331, filed Mar. 3, 2014, which disclosures are herein incorporated by reference in their entirety.

FIELD

The present disclosure generally relates to graphical user interfaces and more specifically to systems and methods of transferring data acquisition and analysis settings.

BACKGROUND

"Copy and paste," and "drag and drop" features in graphical user interfaces have been in existence for a long time.

"Copy and paste" or "cut and paste" before computers was done with scissors and glue. In computers these features appeared in text editors as a component of most operating systems. The application of copy and paste allows a user to select a part of a document and then save it to a temporary buffer. Such buffers are commonly referred to as clipboards. A "copy" leaves the document unchanged and a "cut" deletes or removes the selected portion. The application of "paste" inserts the data from the buffer or clipboard at the current position of the document. If there is data selected prior to "pasting" that data will be removed or deleted. As the "copy and paste" function developed it moved into the realm of graphical user interfaces where not only text can be copied and pasted, but so can icons and the data they contain. This kind of function allows documents to be moved from one window to another window efficiently.

The "Drag and drop" feature in graphical user interfaces requires a mouse or similar such device and is a feature that allows an icon or image, representing a file, to be moved from one part of a graphical user interface to another. Execution of the drag and drop involves a user moving a visual representation of a mouse (typically a "pointer" graphic) over an icon or image, depressing a mouse button, holding the mouse button while moving the mouse which allows for dragging of the icon to another location, and then releasing the button which drops the icon.

The "copy/cut and paste" and "drag and drop" features in graphical user interfaces incorporate several overlapping concepts that will be readily appreciated by those skilled in the art. For example, an icon can be selected, cut, and then pasted into a new directory which performs the same function was the drag and drop.

As with many computer applications, applications that interact with external instruments, such as flow cytometers, can also employ the above-mentioned features. For example, if several experiments were run on an instrument, certain settings are used to specify how the hardware of that instrument was used that can include data acquisition components and certain settings are used to specify how data analysis is conducted. Generally, such settings are saved to a hard disk or other such storage device. Often a large number of experiments and their associated settings become burdensome to manage not only in terms of organization, but also in propagating settings from one experiment to another. Currently, a user can copy and paste individual settings from one experiment to another.

What is needed is a multi-level, or tiered, organizational system that allows a user to copy desired setting(s) from an experiment to a selected experiment and to propagate those settings through all the levels or tiers that are associated with the selected experiment. Furthermore, a way to allow specified experiments to retain their original settings while propagating the new settings to the others is desired. Such a system would involve combining the features of "copy and paste" and "drag and drop." Ultimately, a multi-leveled system with this feature will save a user time, energy, and will ensure that the desired settings have been changed.

SUMMARY

In one aspect, a computer implemented method, using a processor, memory and data storage subsystems for providing visual feedback in a graphical user interface (GUI) having a menu listing for transferring settings from one experiment directory to another experiment directory by dragging and dropping icons in the GUI is disclosed. The method can include displaying a GUI having a navigation system including a plurality of icons and levels. The method can include receiving a selection from a user of a first icon located on one of the displayed levels wherein the first icon is associated with a first set of settings. The method can include receiving a selection from a user to drag the first icon and drop the first icon onto a second icon located on one of the displayed levels wherein the second icon is associated with a second set of settings. The method can include responding to dropping the first icon onto the second icon by overwriting the second set of settings with a copy of the first set of settings. The method can include responding to overwriting the second set of settings by updating the GUI to display the changes.

In one aspect, a system for transferring settings from one experiment directory to another experiment directory by dragging and dropping icons in a graphical user interface (GUI) is disclosed. The system can include a computer-readable medium. The system can include one or more processors. The system can include a display for displaying a GUI. The system can include an interface configured to facilitate interaction between a user and the GUI. The system can include instructions stored in the computer-readable medium and configured for execution by the one or more processors. The instructions can include displaying a GUI having a navigation system including a plurality of icons and levels. The instructions can include receiving a selection from a user of a first icon located on one of the displayed levels wherein the first icon is associated with a first set of settings. The instructions can include receiving a selection from the user to drag the first icon and drop the first icon onto a second icon located on one of the displayed levels wherein the second icon is associated with a second set of settings. The instructions can include responding to dropping the first icon onto the second icon, overwriting the second set of settings with a copy of the first set of settings. The instructions can include responding to overwriting the second set of settings, updating the GUI to display the changes.

In one aspect of a computer readable medium containing program instructions for transferring settings from one experiment directory to another experiment directory by dragging and dropping icons in a graphical user interface (GUI), wherein execution of the program instructions by one or more processors of a computer system causes the one or more processors is disclosed. The instructions can include displaying a GUI having a navigation system including a plurality of icons and levels. The instructions can include receiving a selection from a user of a first icon located on one of the displayed levels wherein the first icon is associated with a first set of settings. The instructions can include receiving a selection from a user to drag the first icon and drop the first icon onto a second icon located on one of the displayed levels wherein the second icon is associated with a second set of settings. The instructions can include responding to dropping the first icon onto the second icon by overwriting the second set of settings with a copy of the first set of settings. The instructions can include responding to overwriting the second set of settings, updating the GUI to display the changes.

BRIEF DESCRIPTION OF THE SEVERAL VIEWS OF THE DRAWINGS

For a more complete understanding of the principles disclosed herein, and the advantages thereof, reference is now made to the following descriptions taken in conjunction with the accompanying drawings, in which:

FIG. 4 is an example embodiment of an implementation for transferring settings relating to an instrument from one experiment directory to one or more other experiment directories by dragging and dropping icons in a graphical user interface.

Figure 1:
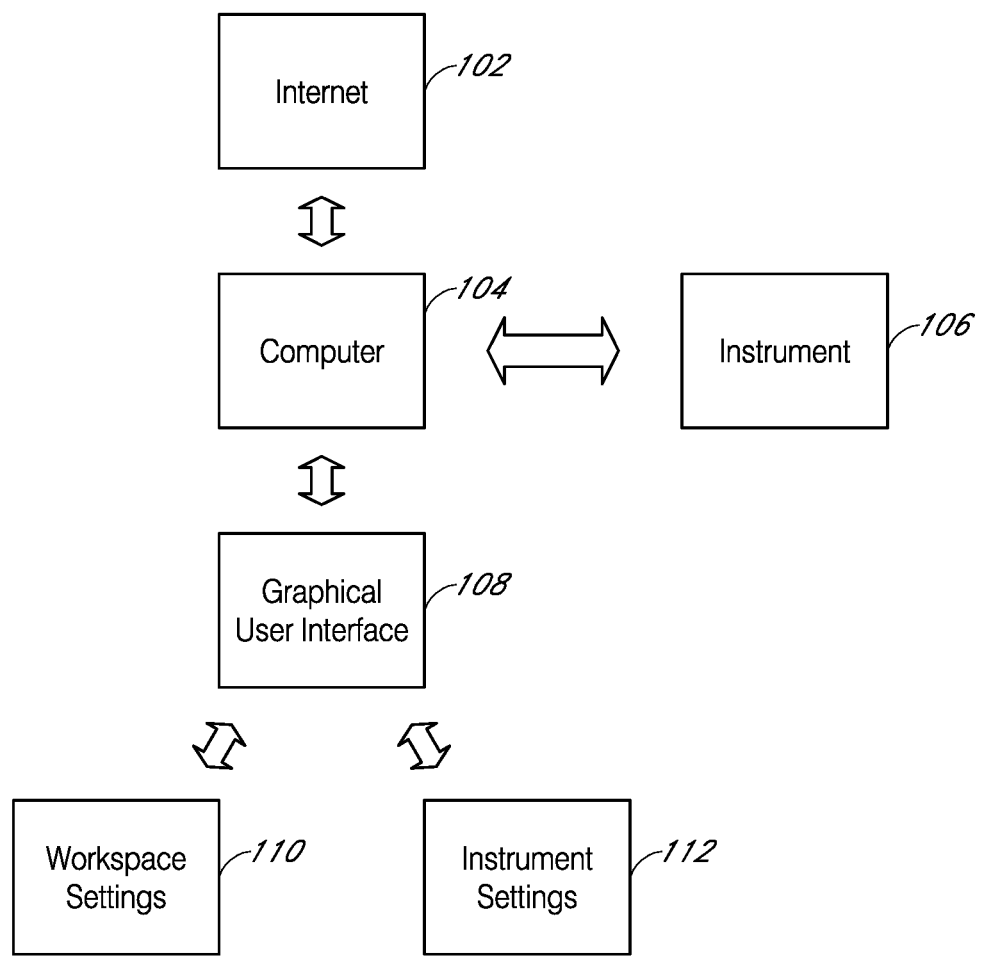
FIG. 1 is an illustration of a generalized system configuration for one of various embodiments for a graphical user interface for transferring data acquisition and analysis settings.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Furthermore, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

In order that the present disclosure may be more readily understood, certain terms are first defined. Additional definitions are set forth throughout the detailed description.

DETAILED DESCRIPTION

Embodiments of systems and methods for transferring settings relating to an instrument from one experiment directory to one or more other experiment directories by dragging and dropping icons in a graphical user interface are described in the accompanying description and figures, which includes Exhibit 1. In the figures, numerous specific details are set forth to provide a thorough understanding of certain embodiments. A skilled artisan will be able to appreciate that the system described herein can be used in in conjunction with a variety of instruments including, but not limited to, flow cytometers. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences can be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Furthermore, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

In order that the present disclosure may be more readily understood, certain terms are first defined. Additional definitions are set forth throughout the detailed description.

As used herein "data acquisition settings" means the collection of all voltages, threshold settings, area scaling factors, window extensions, and width measurement threshold settings that comprising the "instrument settings."

As used herein "data analysis settings" means the collection of plots, gates, statistics, images, and textboxes that comprise the "workspace settings."

As used herein "instrument" means any piece of hardware external to a computer.

As used herein "instrument settings" means anything related to hardware settings for an instrument.

As used herein "interface" means any device used for communication between a user and a graphical user interface. Examples include, but are not limited to, a keyboard, mouse, microphone, or camera.

As used herein "levels" refer to tiers in a data structure.

As used herein "settings" or "data settings" can mean instrument settings, workspace settings, data acquisition settings, and/or data analysis settings.

As used herein "workspace settings" means anything relating to tasks being done on a computer, specifically, data analysis.

In various embodiments, the system disclosed in the present application can be used in conjunction with various apparatuses, systems, and methods relating to flow cytometry. See U.S. patent application Ser. Nos. 12/239,390 and 12/209,084, both of which are incorporated by reference in their entirety. Also see *Practical Flow Cytometry, 4th Edition*, Howard M. Shapiro, which is incorporated by reference in its entirety.

As with many computer applications, applications that interact with external instruments, such as flow cytometers often involve a large number of experiments and their associated settings become burdensome to manage not only in terms of organization, but also in propagating settings from one experiment to another. Copying and pasting individual settings from one experiment to another is unduly burdensome and the following disclosure presents a way to reduce that burden and increase efficiency.

Referring to FIG. 1, a schematic of a hardware system interacting with a graphical user interface is shown. Although the data structure presented herein does not require an instrument 106, various embodiments in the present disclosure include an instrument 106. In various embodiments a computer 104 can interact with an instrument 106 which in various embodiments can be a flow cytometer. There are various known ways to connect pieces of hardware including, but not limited to universal serial buses, Ethernet, and coaxial connections.

The computer 104 can incorporate various pieces of hardware that are not illustrated in FIG. 1 including, but not limited to, processor(s), printers, computer-readable media, laser driven drives, telecommunications boards, displays, and audio output devices. Computers 104 can also comprise various types of interfaces including, but not limited to keyboards, mice, and microphones. Such interfaces are used to allow a user to communicate or give instructions to the computer 104. Computers 104 often are capable of connecting to networks such as the internet 102 and well as sending data to a display that projects a graphical user interface 108. In various embodiments, the graphical user interface 108 can display workspace settings 110 and instrument settings 112. There are various pieces of hardware and aspects of graphical user interfaces 108 that are presently known in the art that can be incorporated into the various embodiments herein that will be readily appreciated by skilled artisans.

Various embodiments of the system for transferring settings relating to an instrument from one experiment directory to one or more other experiment directories by dragging and dropping icons in a graphical user interface 108 can comprise a computer-readable medium, one or more processors, a display for displaying a graphical user interface, an interface configured to facilitate interaction between a user and the graphical user interface, and instructions stored in the computer-readable medium and configured for execution by one or more processors. Various embodiments of the instructions can be found throughout this specification.

Figure 2:
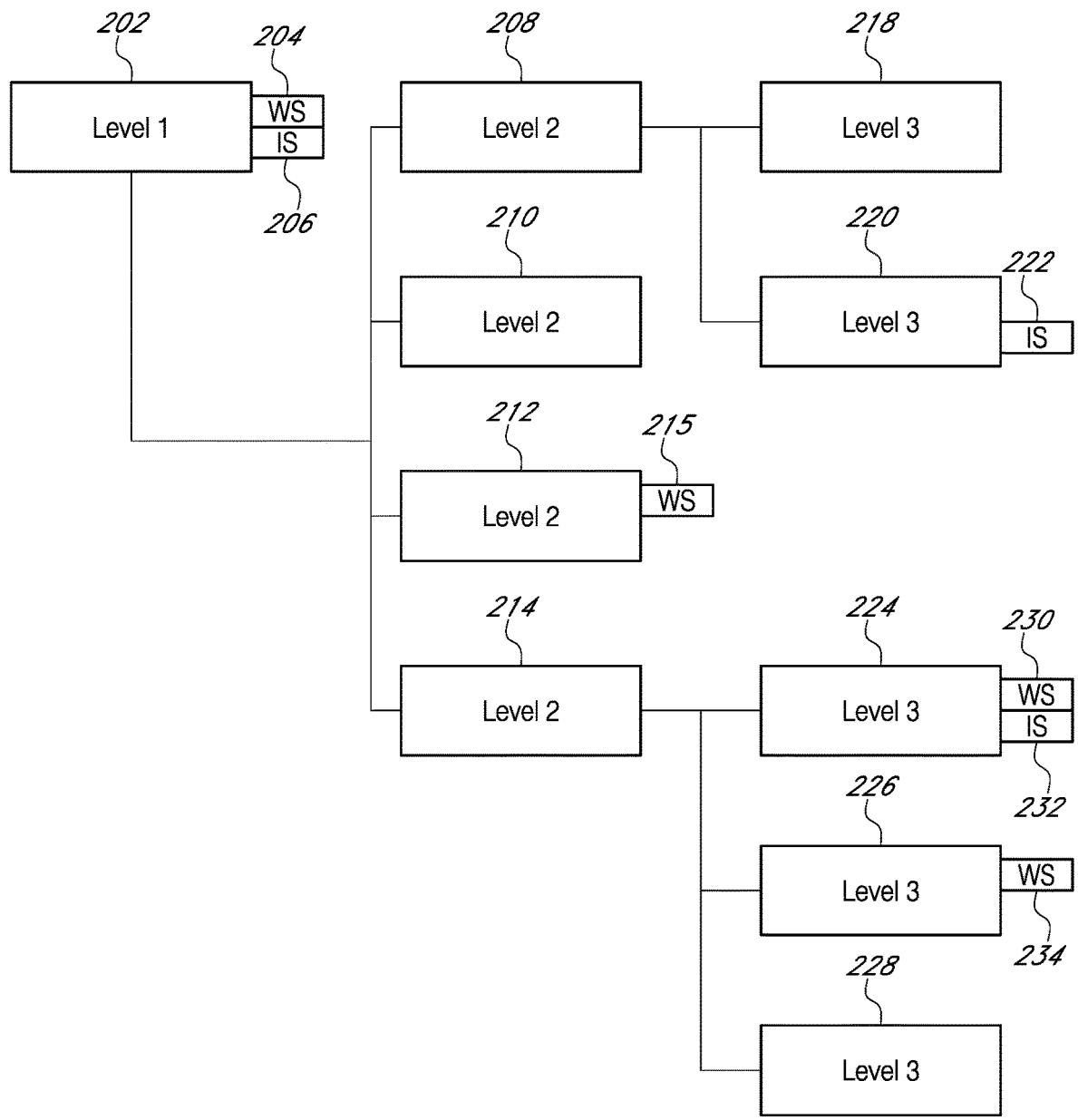
FIG. 2 is an illustration of one of various embodiments of an organizational structure for data acquisition and analysis settings.

FIG. 2 illustrates one example of various embodiments of an organizational structure for data acquisition and data analysis settings. Such an organizational structure includes levels blocks 202, 208, 210, 212, 214, 218, 220, 224, 226, and 228 and icons 204, 206, 215, 222, 230, 232, and 234. "WS" is an abbreviation for workspace settings 110 and "IS" is an abbreviation for Instrument settings 112. Blocks (the boxes with "level" centered in them) can be experiments and, as discussed, boxes with "WS" or "IS" can be experimental settings associated with an experiment. As seen in FIG. 2, there are three levels and two types of settings ("WS", "IS"). Various level blocks have workspace settings 110 and/or instrument settings 112 attached to them which is depicted by attached blocks labeled "WS" and "IS". Other level blocks do not have specific workspace settings 110 and instrument settings 112 attached, however, they still have associated workspace 110 and instrument 112 settings. For example, block 202 in level 1 of the structure has attached "WS" 204 and "IS" 206. The blocks in the next level down (level 2) without attached workspace 110 and instrument 112 settings (no "WS" or "IS" box attached) adopt the settings of the associated block (as shown by line drawing) in the higher level. In FIG. 2, blocks 208, 210, and 214 adopt "WS" 204 and "IS" 206 settings as seen in the associated block 202 in level 1. The level 2 block 212 has an attached "WS" 215 which are different from those stemming from block 202 ("WS" 204) in level 1. Such differentiation is depicted in the graphical representation by block 212 in level 2 having its unique settings displayed in boxes next to it.

The same principles shown above control throughout the data structure. As discussed, block 214 in level 2 is associated with "WS" 204 and "IS" 206 from block 202 in level 1. However, block 224 in level 3 is attached to "WS" 230 and "IS" 232 which are different from "WS" 204 and "IS" 206 and, therefore, have unique workspace 110 and instrument 112 settings. Block 226 in level 3 has its own unique workspace settings 110 ("WS" 234), but is associated with "IS" 206 from level 1. Block 228 in level 3 is associated with "WS" 204 and "IS" 206 from block 202 in level 1 which is shown by no attached boxes in block 228 in level 3 and block 214 in level 2. Had block 214 in level 2 had attached settings those would override the settings from block 202 in level 3 with regard to block 228. In other words, settings flow downstream through the level system.

Block 210 in level 2 does not have attached boxes so its workspace 110 and instrument 112 settings are associated with block 202 in level 1 ("WS" 204 and "IS" 206). Block 208 in level 2 is similar to block 210 in that its workspace 110 and instrument 112 settings are associated with block 202 in level 1. Block 218 in level 3 also has no attached workspace 110 and instrument 112 settings. If block 208 had attached workspace 110 or instrument 112 settings block 218 would associate with those, but instead we need to look further up the data structure, once again, to block 202 and its attached settings. Block 222 in level 3 has attached "IS" 222, but no attached "WS". Once again, looking back up the data structure the first attached workspace 110 data setting that can be found is "WS" 204.

In various embodiments of the present disclosure workspace 110 and instrument 112 settings can be transferred in a way that allows the transfer to propagate downstream in the organizational structure.

For example, in various embodiments a graphical user interface 108 can display something similar to what is illustrated in FIG. 2 (Also see FIG. 4). A user could select "WS" 215 with a mouse pointer, drag "WS" 215 to block 202, and then drop "WS" 215 onto block 202. In response to dropping "WS" 215 onto block 202 the instructions can comprise overwriting the settings originally contained in block 202 ("WS" 204) and replacing those settings with the data associated with "WS" 215. Any of the blocks in levels below block 202 in the same path (see lines in FIG. 2) would then be associated with "WS" 215 instead of "WS" 204. In response to overwriting the settings the graphical user interface 108 could then be updated to reflect such an occurrence. In various embodiments, instrument settings 112 can be copied and propagated in a similar fashion. In various embodiments, workspace 110 and/or instrument 112 settings can be copied to other blocks within the same level. In various embodiments, workspace 110 and/or instrument 112 settings can be copied to other blocks in levels either above or below.

Figure 3:
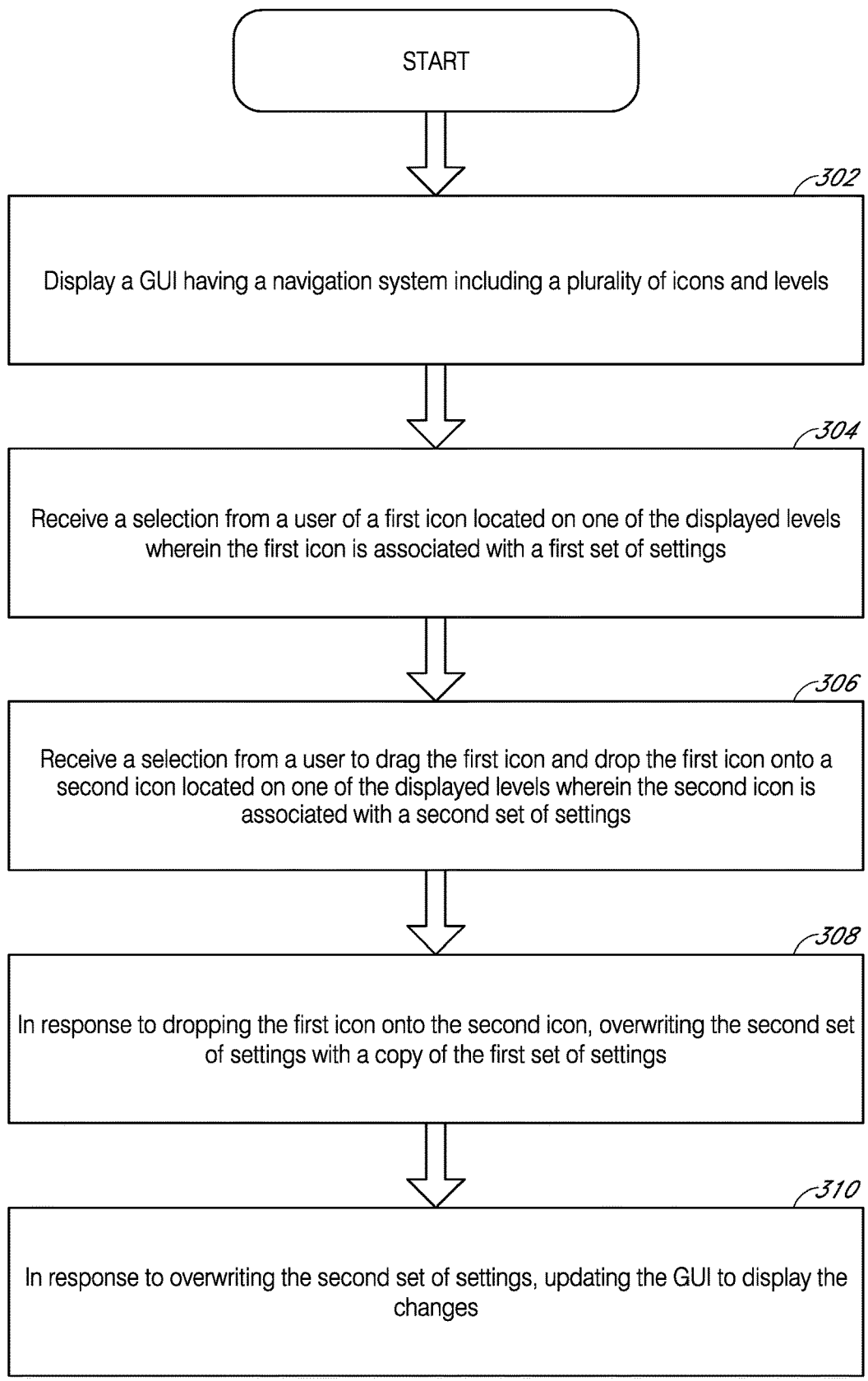
FIG. 3 illustrates a flow diagram according to one of various embodiments to transfer settings relating to an instrument from one experiment directory to one or more other experiment directories by dragging and dropping icons in a graphical user interface.

FIG. 3 illustrates a flow diagram according to one of various embodiments to transfer settings relating to an instrument from one experiment directory to one or more other experiment directories by dragging and dropping icons in a graphical user interface.

In step 302, a GUI can be displayed having a navigation system including a plurality of icons and levels.

In step 304, a selection can be received from a user of a first icon located on one of the displayed levels wherein the first icon is associated with a first set of settings. For example, a user can click and hold a mouse button to select a first icon. Icons can be any graphical representations in a graphical user interface 108. Such icons can represent workspace settings 110 or instrument settings 112. These settings can either be related to how the instrument 106 collects data (data acquisition) and/or can be related to how data is analyzed in a computer 104.

In step 306, a selection can be received from a user to drag the first icon and drop the first icon onto a second icon located on one of the displayed levels wherein the second icon is associated with a second set of settings. In various embodiments, the first icon can be associated with be workspace settings 110 or instrument settings 112. In various embodiments, the first icon can represent both workspace 110 and instrument 112 settings.

In step 308, a response to dropping the first icon onto the second icon associated with the second set of settings can be to overwrite second set of settings with a copy of the first set of settings.

In step 310, a response to overwriting the second set of settings can be to update the GUI to display the changes. These responses can be made by the computer 104 and its associated hardware and software.

In various embodiments, the settings of the lower levels downstream of the second icon can also be overwritten and updated. Such a feature has been included in the discussion surrounding FIG. 2. The propagation of settings in such a manner allows for increased efficiency when a user is working with dozens, hundreds, or more individualized experiments.

In various embodiments, the settings of the lower levels downstream of the second icon with unique identifiers do not have to be updated. Such a feature can allow a user to create unique settings for an experiment (also referred to as blocks earlier in this specification) in a lower level without having to worry that completing the described action where the drop occurs on a higher level will result in their settings being overwritten.

In various embodiments, the graphical user interface 108 displays the data setting changes to the lower levels downstream of the second icon. Such a feature allows a user to know what data setting changes have been made and to which experiments. The changes can be propagated flowing downstream in a path through various levels of the data structure.

In various embodiments of the method, the settings can either be data acquisition settings, data analysis settings, or both data acquisition and data analysis settings.

In various embodiments of the method, the instrument 106 can be a flow cytometer and the workspace 110 (data analysis) and instrument 112 (data acquisition) setting can be related to flow cytometry systems and methods.

FIG. 4 illustrates an example of a graphical user interface 108 displaying a similar data structure to what is illustrated in FIG. 2. An application panel 402 displays the name of the application. A top directory 404, or user folder, can contain various subdirectories. The levels or directories in this example are displayed as experiments 406, groups 408, and samples 412, 414, 416, and 418. Workspace 110 and instrument 112 settings can also be seen as "WS" and "IS" attached to the directories.

The experiment labeled as "Tube experiment 2" 406 can be seen to be attached to workspace settings 110 and instrument settings 112. In this example, "Group 1" and "Group 2" share the same settings as shown by both these groups not being attached to settings. "Group 3" also shares the same instrument settings 112 as "Tube experiment 2," 406 but can be seen to have unique workspace settings 110 that appear as "WS" 410. "Sample 1" 412 and "Sample 4" 418 can both be seen to have unique workspace 110 and instrument settings 112 attached to them. "Sample 2" 414 is shown to have unique workspace settings 110, but shares the same instrument settings 112 with "Tube experiment 2" 406. "Sample 3" is shown to have workspace settings 110 associated with "Group 3" 408 and instrument settings 112 associated with "Tube experiment 2" 406.

As previously discussed in the present specification, there are various embodiments of a system and method to facilitate the transfer and propagation of settings downstream of the drop off point.

For example, if "IS" 412 is dragged and dropped onto "Tube Experiment 2" 406 the instrument settings 112 attached to "Tube Experiment 2" will be replaced with the instrument settings represented by "IS" 412. Furthermore, any subdirectory without unique instrument setting 112 can now be associated with and use the instrument settings 112 that originated from "IS" 412. In this example these include "Group 3," "Sample 2," "Sample 3," and "Sample 5."

For another example, if "WS" 410 is dragged and dropped onto "Sample 3" 416 the workspace settings 410 would be applied to "Sample 3."

For another example, if "WS" 410 is dragged and dropped onto "Sample 4" 418 then the workspace settings 110 of "Sample 4" would be replaced with the workspace settings 110 depicted in "WS" 410 and "Sample 4" now displays a "WS" to indicate that workspace settings 110 have been created at this level.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The invention claimed is:

1. A computer implemented method, using a processor, memory and data storage subsystems for providing visual feedback in a graphical user interface (GUI) having a menu listing for transferring settings from one experiment directory to another experiment directory by dragging and dropping icons in the GUI, comprising the steps of:
displaying a GUI having a navigation system including a plurality of icons and displayed levels;
receiving a selection from a user of a first icon boated on one of the displayed levels wherein the first icon is associated with a first set of settings in a settings category,
receiving a selection from a user to drag the first icon and drop the first icon onto a second icon located on one of the displayed levels,
wherein the second icon is associated with a second set of settings in the settings category,
wherein the second icon is associated with downstream settings associated with a lower level downstream of the level on which the second icon is located;
in response to dropping the first icon onto the second icon, overwriting the second set of settings in the settings category with a copy of the first set of settings in the settings category such that there are changes made to the second set of settings in the settings category and overwriting the downstream settings associated with the lower level downstream of the second icon,
wherein downstream settings (i) associated with the lower level downstream of the level on which the second icon is located and (ii) having unique identifiers relative to the first and second icons are not overwritten; and
in response to overwriting the second set of settings in the settings category, updating the GUI to display the changes made to the second set of settings in the settings category.

2. The method of claim 1, wherein the GUI displays the changes to the downstream settings associated with the lower level downstream of the second icon.

3. The method of claim 1, wherein the settings are data acquisition settings.

4. The method of claim 1, wherein the settings are data analysis settings.

5. The method of claim 1, wherein the settings are data acquisition settings and data analysis settings.

6. The method of claim 1, wherein the settings relate to an instrument, and the instrument is a flow cytometer.

7. A system for transferring settings from one experiment directory to another experiment directory by dragging and dropping icons in a graphical user interface (GUI), comprising:
a computer-readable medium;
one or more processors;
a display for displaying a GUI;
an interface device for facilitating interaction between a user and the GUI;
instructions stored in the computer-readable medium and configured for execution by the one or more processors, the instructions comprising instructions to:
display a GUI having a navigation system including a plurality of icons and levels;
receive a selection from a user of a first icon located on one of the displayed levels wherein the first icon is associated with a first set of settings in a settings category;
receive a selection from the user to drag the first icon and drop the first icon onto a second icon located on one of the displayed levels,
wherein the second icon is associated with a second set of settings in the settings category,
wherein the second icon is associated with downstream settings in the settings category associated with a lower level downstream of the level on which the second icon is located;
in response to dropping the first icon onto the second icon, overwriting the second set of settings in the settings category with a copy of the first set of settings in the settings category such that there are changes made to the second set of settings in the settings category and overwriting downstream settings in the settings category associated with the lower level downstream of the second icon, wherein downstream settings in the settings category (i) associated with the lower level downstream of the level on which the second icon resides and (ii) having unique identifiers relative to the first and second icons are not overwritten; and
in response to overwriting the second set of settings in the settings category, updating the GUI to display changes made to the second set of settings in the settings category.

8. The system of claim 7, further comprising instructions wherein the GUI displays the changes to the downstream settings in the settings category associated with the lower level downstream of the second icon.

9. The system of claim 7, wherein the settings are data acquisition settings.

10. The system of claim 7, wherein the settings are data analysis settings.

11. The system of claim 7, wherein the settings are data acquisition settings and data analysis settings.

12. The system of claim 7, further comprising an instrument.

13. The system of claim 12, wherein the instrument is a flow cytometer.

* * * * *